US008616118B1

(12) United States Patent
Lassota

(10) Patent No.: US 8,616,118 B1
(45) Date of Patent: Dec. 31, 2013

(54) BREWER WITH BREW BASKET HAVING ELECTROMAGNETIC DRAIN HOLE CLOSURE

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 312 days.

(21) Appl. No.: 12/942,603

(22) Filed: Nov. 9, 2010

Related U.S. Application Data

(60) Provisional application No. 61/259,838, filed on Nov. 10, 2009, provisional application No. 12/891,328, filed on Sep. 28, 2010, provisional application No. 61/246,502, filed on Sep. 28, 2009.

(51) Int. Cl.
*A47J 31/10* (2006.01)

(52) U.S. Cl.
USPC ............................. 99/299; 99/300; 99/307

(58) Field of Classification Search
USPC .......................................... 99/299, 300, 307
See application file for complete search history.

(56) References Cited

U.S. PATENT DOCUMENTS

| 2,887,036 | A | * | 5/1959 | Voglesonger et al. | ...... 99/289 R |
| 4,558,640 | A | * | 12/1985 | Marchant | ........................ 99/307 |
| 5,102,546 | A | * | 4/1992 | Salomon | ....................... 210/469 |
| 5,957,036 | A | * | 9/1999 | Warner et al. | ................... 99/299 |
| 7,231,870 | B2 | * | 6/2007 | Lowe et al. | ...................... 99/299 |
| 7,717,026 | B1 | * | 5/2010 | Lassota | .......................... 99/283 |
| 2007/0240581 | A1 | * | 10/2007 | Chen | .............................. 99/279 |

FOREIGN PATENT DOCUMENTS

| DE | 3539250 | * | 5/1987 |
| EP | 622040 | * | 11/1994 |
| JP | 2002307042 | * | 5/2004 |
| KR | 2009039858 | * | 4/2009 |

* cited by examiner

*Primary Examiner* — Anthony Weier
(74) *Attorney, Agent, or Firm* — James W. Potthast; Potthast & Associates

(57) ABSTRACT

A beverage brewer (10) having a housing (16, 30) with source of dispense water (37, 39) for mixing with beverage ingredient to produce a freshly brewed beverage has an electromagnet (76) mounted to the housing (30) and a brew basket assembly (32, 34) with a drain plug assembly (49) that is responsive to energization of the electromagnet (76) to actuate a drain plug assembly to move a drain plug (48) out of blocking engagement with a drain hole (61). The drain plug (48) is attached to a lower end of a plug support member (50) that has an upper magnetic responsive end (51) that is received within a hollow core of (54) of the magnet (76) when the brew basket assembly (32, 34) is toolessly mounted to by raising it into operative position where it is held by mating magnetic connectors (72, 74). During use, the elongate plug support member (50) is used as a handle to remove a filter assembly (60) for cleaning.

25 Claims, 2 Drawing Sheets

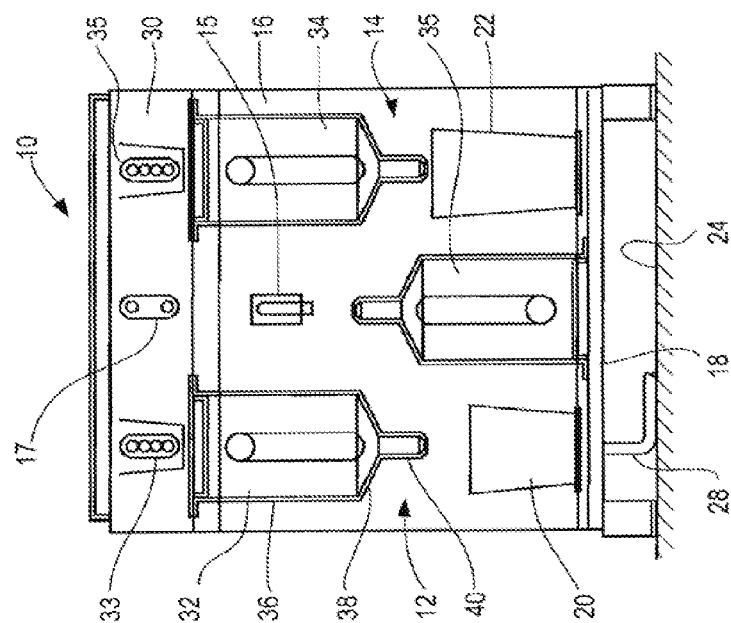
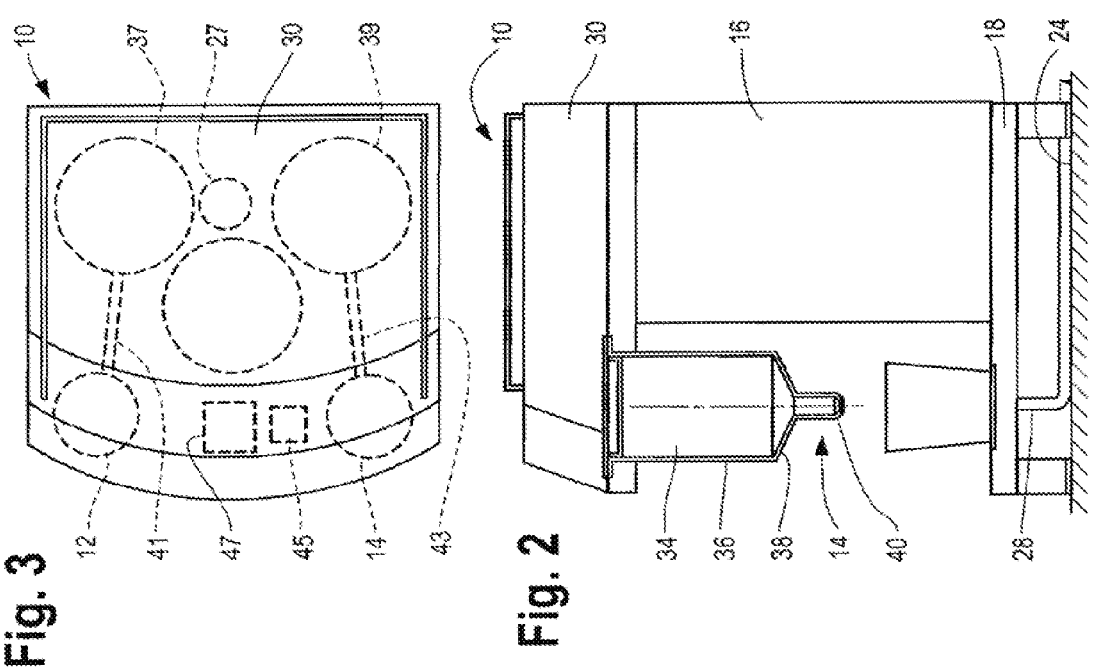

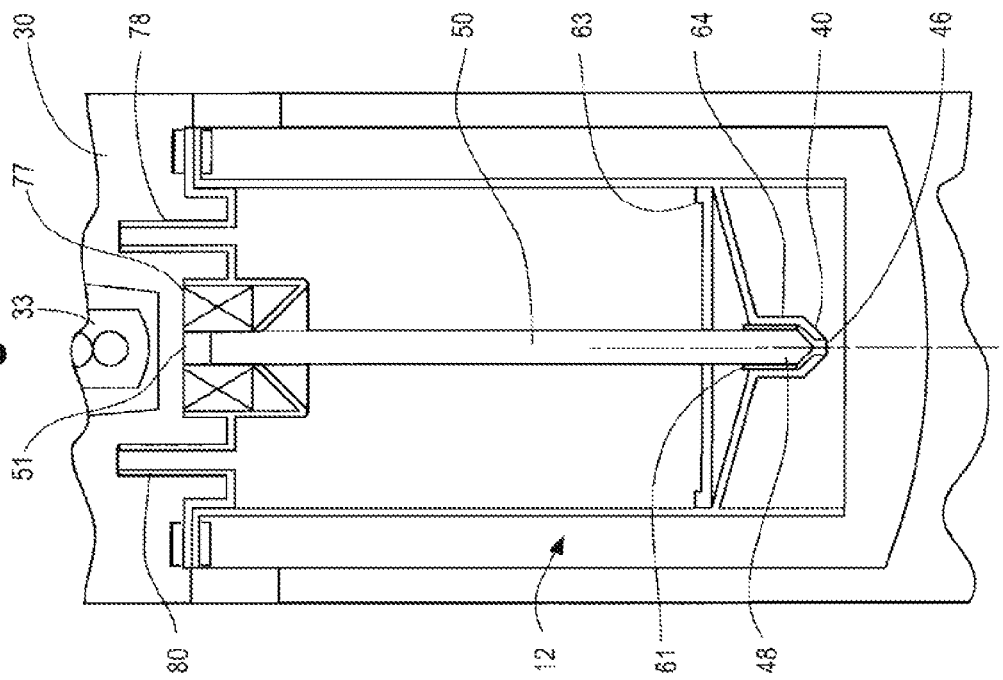
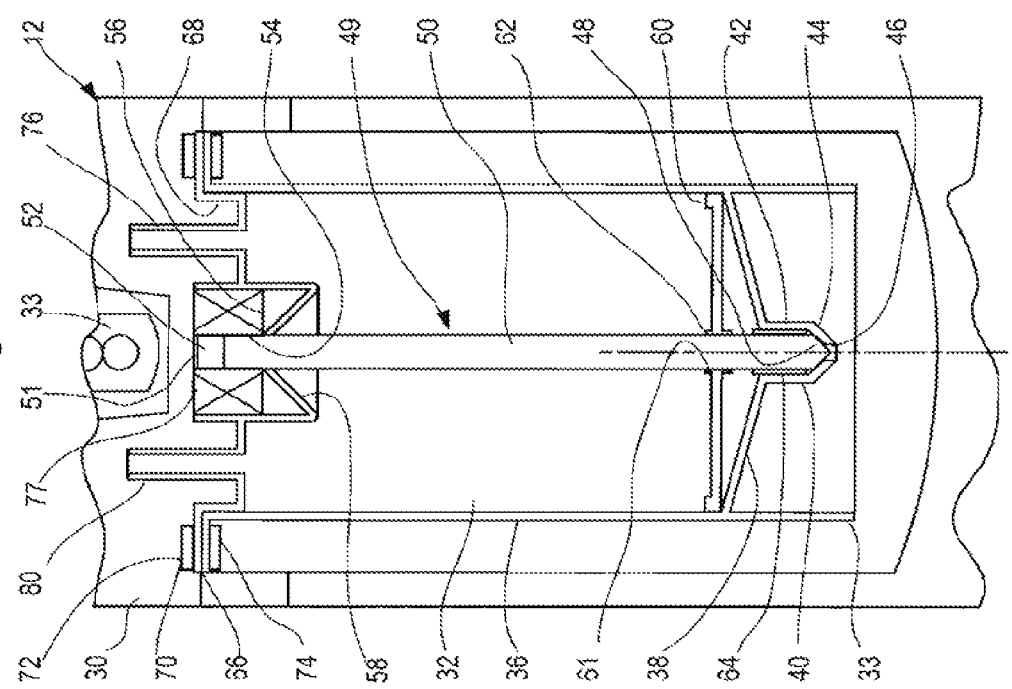

BREWER WITH BREW BASKET HAVING ELECTROMAGNETIC DRAIN HOLE CLOSURE

CROSS-REFERENCE TO RELATED APPLICATIONS

This application claims the benefit under 35 USC 119(e) of U.S. provisional patent application No. 61/259,838 filed Nov. 10, 2010, and claims the benefit under 35 USC 120 of U.S. patent application Ser. No. 12/891,328 filed Sep. 28, 2010, which, in turn, claims the benefit under 35 USC 119(e) of provisional patent application No. 61/246,502 filed Sep. 28, 2009, all of which are hereby incorporated by reference.

BACKGROUND OF THE INVENTION

1. Field of the Invention

This invention generally relates to electric beverage brewers and, more particularly, to beverage brewers in which a steeping period is required during which beverage is not allowed to drain from a brew basket.

2. Discussion of the Prior Art

Automatic, electric drip type beverage brewers in which a preselected quantity of hot water is passed onto the top of a layer of beverage ingredient, such as freshly ground coffee beans or whole or powdered tea leaves are well known. Most brewers employ a brew basket that has an open drain hole such that beverage drains from the brew basket as soon as the first water percolates to the bottom of the layer of ingredient. In some cases, usually when making freshly brewed tea, it is desired to provide a seeping period during which time the drain hole is automatically closed while most if not all of the water is added to the brew basket. At the end of the seeping period, the drain hole is automatically opened and the entire amount of beverage that has formed with all the water is drained out at once.

A need therefore exist to provide simple and effective and durable means to automatically control the opening and closing of the drain hole of a brew basket that must be easily removed brew housing for cleaning and replenishing the ingredient.

SUMMARY OF THE INVENTION

It is therefore an object of the present invention to provide a beverage brewer and method of brewing in which the simple and durable means are provided for selectively closing and opening a brew basket drain hole.

This objective is achieved in part by providing a beverage brewer having a housing with source of dispense water for mixing with beverage ingredient to produce a freshly brewed beverage, with an improvement having an electromagnet mounted to the housing; a brew basket assembly including a brew basket body having an open top and a bottom with a drain hole, a drain plug assembly with an elongate drain plug support member, a top end portion of the plug support member with a permanent magnetic material or ferromagnetic material, and a bottom end of the plug support member with a plug engagable with the drain hole to close the drain hole; and means for removably, toolessly mounting the brew basket to the housing with the top end of the drain plug support member in a location to be magnetically energizable by the electromagnet to selectively elevate the plug to an open position removed from engagement with the drain hole to allow beverage within the brew basket to drain out of the drain hole.

Preferably, the brew basket body has a cylindrical upper section and a downwardly, inwardly extending, conical, lower section defining the bottom of the brew basket body and the elongate support member and the drain hole are centrally located relative to brew basket body. A plug holder extends downwardly from the bottom of the brew basket and snugly receives a lower end of the elongate drain plug support member adjacent the plug to at least partly support the plug support member in an upright alignment. Also, a reusable filter assembly is snugly but removably mounted within the brew basket body has a mounting hole through which the elongate plug support member is slidably received and which thereby also at least partly supports the elongate drain plug support member in an upright position.

In the preferred embodiment, the elongate drain plug support member carries a blocking member beneath the mounting hole to prevent the passage of the bottom end of the support member to pass through the mounting hole to enable the elongate plug support member to be used as a handle to remove the filter assembly from without the open top of the brew basket body.

The electromagnet has a coil wound around a central hollow core with a downwardly facing opening within which the top end portion of the plug support member is slidably received when the brew basket is mounted to the brewer. A conical guide assists in mating slidable receipt of the magnetic end within the downwardly facing opening of the hollow core.

BRIEF DESCRIPTION OF THE DRAWINGS

The forgoing objects, features and advantages of the present invention will be made apparent and others will be described in the following detailed description of the preferred embodiment which is given with reference to the several figures of the drawings, in which:

FIG. 1 is a front view of a preferred embodiment of the brewer of the present invention;

FIG. 2 is side view, of the brewer of FIG. 2;

FIG. 3 is a plan view of the brewer of FIGS. 1 and 2;

FIG. 4 is an enlarged sectional side view of a portion of the brewer of FIGS. 1-3 showing the brew basket and associated drain hole valve assembly with the valve in a closed position; and FIG. 5 is a sectional side view of a portion of the brewer of FIGS. 1-3 similar to that of FIG. 4 except the electromagnetically controlled drain hole valve assembly is shown in the relatively open position.

DETAILED DESCRIPTION

Referring to FIGS. 1-3, the beverage brewer, or brewer, 10 of the present invention has two substantially identical brewing stations 12 and 14 on opposite left and right sides of a vertically extending aft housing section 16. A hot water station with a hot water faucet 15 is located between the two brewing stations 12 and 14. The aft housing section 16 is supported on a generally rectangular serving platform, or cup supporting base, 18 with an outwardly curved front. The base 18 is shown supporting a relatively small, single serving, removable cup or glass, 20 resting at the left brewing station 12 and a relatively larger cup or glass 22 at the right brewing station 14. The base 18 is supported above a counter top 24 by four substantially identical legs 26 located at four corners of the base 18. This provides space for passage of a drain hose 28 extending downwardly from a drip tray supported within the base 12 and laterally beneath and along the underside of the base 18 to a suitable drain fixture (not shown) located behind the brewer 10.

Supported on top of the aft housing section 16 is a top housing section 30 mounted in cantilever fashion and overhanging a part of the base 18 that extends forwardly of the aft housing section 16. Releasably mounted to the underside of the top housing section 30 at the brew stations 12 and 14 are a pair of substantially identical specialized brew baskets 32 and 34 of the present invention. Each of the brew baskets 32 and 34, such as brew basket 34, has a generally cylindrical upper section 36 and a lower conical section 38 that narrows down to a central drain hole plug holder 40. A spare brew basket 35 is shown resting upside down on top of the base 18 between the brewing stations 12 and 14. The hot water faucet is controlled by push button switches 17, and the operation of the brewing stations 12 and 14 are controlled by push button switches 33 and 35.

The brewer 10 is a commercial drip-type coffee brewer, and as such, contains the usual components including hot water tanks 37 and 39, FIG. 3, respectively associated with stations 12 and 14 and contained within the aft housing section 12. A pair of hot water dispense systems 41 and 43 respectively associated with the hot water tanks 37 and 39 are located partly in the upper housing 30 for passing hot water from the hot water tanks to the associated one of the brew baskets 36 and 34. An electrical DC power supply 45 and a controller 47 are mounted within the upper housing section 16. An operator control interface including the switches 33 and 35 and a status display, such as status lights behind the switches are carried at the outside front of the upper housing section 16. These parts of conventional commercial drip-type coffee brewer are well known in the art of coffee making equipment and reference should be made to any number of patents on such drip-type brewers, if further details are required, such as U.S. Pat. Nos. 5,000,082, filed: Jul. 27, 1988; 5,331,885, filed: Apr. 6, 1993; U.S. Pat. No. 6,148,717, filed: Aug. 11, 1998; and U.S. Pat. No. 6,705,208, filed: Apr. 18, 2002, all of which are hereby incorporated by reference.

Referring now to FIGS. 4 and 5, the details of the brew baskets 32 and 34 and operation of the brew stations 12 and 14 will be described with respect to only the left brew station 12 and the brew basket 32, with the understanding that the two brew baskets 32 and 34 are identical and brew stations 12 and 14 operate in an identical fashion. In accordance with the present invention, a plug holder 40 is formed at the bottom of the cylindrical section 38 of the brew basket 32. The plug holder 40 has an upper cylindrical section 42 that extends downwardly from the cylindrical brew basket conical section 38 to a downwardly, inwardly extending conical, central section 44. The conical section 44 terminates in a circular drain hole 46. Slidably supported within the plug holder 40 is a drain plug 48 located at the end of an elongate drain plug support member 50. The drain plug 48 has a downwardly, inwardly extending conical section 43 that conforms to the shape of the upwardly facing conical section 44 of the plug holder 40. The conical section 43 of the drain plug 48 ends in a point that extends into and thereby closes the drain hole 46 by virtue of gravity unless lifted to an elevated open position.

At the opposite end 51 of the plug support member 50 is a ferromagnetic or magnetic actuation member 52. The ferromagnetic actuation member 52 and an upper portion of plug support member 50 adjacent the end 51 are received within a central, cylindrical passageway 54 of a magnetic coil support housing 56. Merging with the passageway is a conical guide 58 to slidably guide the end 51 of the plug support member 50 into the central passageway 54.

A relatively rigid, annular, gold mesh filter assembly 60 upon which the coffee grounds, tea leaves, etc. are supported during the brew cycle is attached to the bottom of the brew basket 32 at the junction between the cylindrical section 36 and the conical section 38. The annular filter assembly 60 has a central, circular opening 61 surrounded by a cylindrical support collar 62 through which the cylindrical body of the plug support member 50 slidably extends.

The drain plug 48 has at least three radially extending, spaced, vertical vanes 64 that snugly engage the interior surface of the cylindrical section 42 of the plug holder 40. When the brew basket 32 is removed from the brewer 30 and downwardly out of engagement with the magnetic coil holder 56, the plug support member 50 remains attached to the brew basket 32. If the brew basket 32 is supported in an upright position after being removed, by supporting it on its cylindrical leg 29, FIGS. 4 and 5, the plug support member 50 is still held in a generally upright position aligned with the central axis of symmetry of the cylindrical section 36. The cylindrical leg 29 also functions as a splash guard against lateral splashing movement of hot beverage as it emerges from the drain hole 46 sometimes under pressure and protectively surrounds the plug holder 40. The plug support member 50 is supported in this vertical position, in part, by the slidable engagement of the cylindrical body of the plug support member 50 with the mounting hole 61 surrounded by the collar 62 of the filter assembly 60 and, in part, by the engagement of the plug 48, more particularly, the vanes 64, with the inwardly facing, interior surface of the plug holder 40.

If it is desired to remove the plug assembly 49 entirely from the body of the brew basket 32, for purposes of cleaning or otherwise, the plug support member 50 is simply pulled vertically out from engagement with both the plug support member 40 and the collar 61 of the filter assembly 60. The filter assembly 60 is preferably removably mounted to the brew basket 32. It is held in place only by gravity support on the upper part of the conical section 38 and by the lateral engagement of the perimeter with the interior sides of the cylindrical section 36.

The drain plug support member 50 may be entirely removable from the filter assembly 60 without restraint. In such case, outwardly extending radial slots (not shown) may extend from the mounting hole to accommodate passage of the vanes during removal of the plug support member 50. If desired to remove the filter assembly 60 together with plug support member 50, the plug support member 50 is first turned to move the vanes out of alignment with the associated radial slots such that the plug 48 will not pass through the opening 61. Alternatively, if there are no vanes 64, or the vanes 64 are mounted to the interior of the cylindrical section 44 of plug holder 40, the plug support member 50 is provided with an outwardly extending restraint tabs 61, FIG. 5. The restraint tabs 61 are located beneath the filter assembly 60 to block the plug support member 50 from being slidably removed upwardly through the mounting hole 61. In either event, the plug support member 50 is preferably used as a handle to remove both the plug support member 50 and the filter assembly 50. If desired, after removal, the plug support member 50 may be removed for cleaning or replacement by sliding it out of the hole 61 in the opposite direction with the end 51 passing through the hole 61 first, after the filter assembly 60 has been removed. Preferably, the filter assembly has a circular, peripheral support frame 63 surrounding and strengthening the reusable disc of filter mesh material.

In accordance with the brewing method of the present invention, coffee grounds, tea leaves or other dry ingredient are placed on top of the filter assembly 60 before the brew basket is attached to the upper brewer housing 30. The brew basket 32 is then lifted into the fully operative position, as shown in FIG. 4.

While being lifted, the end 51 of the plug support member is guided by the conical section 58 into the cylindrical section 54 of the electromagnetic coil holder 56. A horizontal, annular collar 66 at the top of the cylindrical section of the brew basket 32 is slid past a cylindrical neck 68 carried by the housing section 30 and pressed against a mating horizontal, annular collar 70 surrounding the top of the cylindrical neck 68. Permanent magnets or ferromagnets 72 fixedly mounted to the top of the collar 70 magnetically interact with permanent magnets of opposite pole or ferromagnets 74 mounted to the underside of the collar 66 to releasably hold the two collars 66 and 70 against each other, as shown. Other types of fasteners, such a screw-type fasteners or rotary post and slot interlocks that would require the brew basket 32 to be rotated slightly while being held vertically in position, spade fasteners or the like could also be employed in lieu of magnets.

An annular, magnetic coil 76 is protectively housed within the coil mounting assembly 56 and surrounds the cylindrical section 54. Before the start of a brew cycle, the electromagnetic coil is not energized and no electromagnetic force is imparted to the electromagnetic member 52. Accordingly, the plug support member 50 and the plug 48 fall into and rest in the closed position shown in FIG. 4 with the plug 48 resting upon the cylindrical section 44 of the plug holder 40 with the downwardly facing tip pressed into the top of the drain hole 46 and effectively closing it off against downwardly flow of beverage.

Hot water is then infused into the brew basket through a hot water inlet 76. After a preselected amount of time, depending upon volume, strength and other parameters, the controller 47, through a suitable interface, automatically causes the electromagnet 77 to become energized. After a preselected time required for drainage of the entire amount of beverage, the controller 47 automatically de-energizes the electromagnet 77 to allow the drain plug 48 to fall back down into a blocking position closing the drain hole 46. With the drain hole 46 closed, the brew basket assembly 32 may then be removed from the brewer 10 without concern for residual hot beverage leaking out of the drain hole 46. Advantageously, in the event of an electrical power loss to the brewer 10, the drain hole 46 is automatically closed when the electromagnetic 77 also losses power. When the electromagnet is energized, an electromagnetic force is created that overcomes gravity forces and causes the plug support member 50 and the plug 48 to rise to an open position, as shown in FIG. 5. As seen in FIG. 5, in the open position, the plug 48 is elevated above the drain hole 46 to allow beverage to flow through passageways between the vanes 64, past the body of the plug 48 and through the drain hole 46. At the same time as the drain hole 46 is opened and beverage is allowed to leave the brew basket 32, the controller 47 causes air or other gas from a source may be injected into the brew basket 32 through a gas inlet 80 to pressurize the interior and accelerate the discharge of the beverage though the drain hole 46 and out of the brew basket.

It should be appreciated that may variations may be made without departing from the spirit of the invention. The unique brew basket and drain plug assembly can be used to produce mixed drinks other than freshly brewed coffee or tea or the like. In such case, the brew basket may be permanently attached to the brewer 10 and concentrate and water are added to the brew basket through the water and gas inlets. In such case, the body of the plug holder could carry mixing vanes caused to rotate when in a closed position. Other obvious variations will occur to those skilled in the art of coffee brewers and the like. Also, it should be appreciated that an advantage of the present invention is that the entire drain plug and drain plug mounting including the drain plug support member are all protectively contained within the brew basket and may all be easily removed for cleaning or replacement. Importantly, the ability to selectively close or no close the drain hole 46 during the brew cycle enables greater flexibility to the brewer to make beverage wither with or without a seeping period during the brew cycle.

The invention claimed is:

1. In a beverage brewer having a housing with source of dispense water for mixing with beverage ingredient to produce a freshly brewed beverage, the improvement comprising;
   an electromagnet mounted to the housing;
   a brew basket assembly including
      a brew basket body having an open top located adjacent the electromagnet and a bottom with a drain hole,
      a drain plug assembly with
         an elongate upstanding drain plug support member,
         a top end portion of the plug support member with a permanent magnetic material or ferromagnetic material located adjacent the open top of the brew basket body, and
         a bottom end of the plug support member with a plug engagable with the drain hole to close the drain hole; and
   means for removably, toolessly mounting the brew basket to the housing with the top end portion of the draw plug support member in a location to be magnetically energizable by the electromagnet to selectively elevate, the plug to an open position removed from engagement with the drain hole to allow beverage within the brew basket to drain out of the drain hole.

2. The beverage brewer of claim 1 in which
   the brew basket body has a cylindrical upper section and a downwardly, inwardly extending, conical, lower section defining the bottom of the brew basket and having a vertical extent substantially less than that of the cylindrical upper section, and
   the elongate support member and the drain hole are centrally located relative to brew basket body.

3. The beverage brewer of claim 1 in which the brew basket body has a plug holder that extends downwardly from the bottom and snugly receives a lower end of the elongate drain plug support member adjacent the plug to at least partly support the plug support member in an upright alignment.

4. In a beverage brewer having a housing with source of dispense water for mixing with beverage ingredients to produce a freshly brewed beverage, the improvement comprising:
   an electromagnet mounted to the housing;
   a brew basket assembly including
      a brew basket body having an open top and a bottom with a drain hole,
      a drain plug assembly with
         an elongate drain plug support member,
         a top end portion of the plug support member with a permanent magnetic material or ferromagnetic material, and
         a bottom end of the plug support member with a plug engagable with the drain hole to close the drain hole;
   a filter assembly snugly mounted within the brew basket body, with a mounting hole through which the elongate plug support member is slidably received; and
   means for removably, toolessly mounting the brew basket to the housing with the top end of the drain plug support member in a location to be magnetically energizable by the electromagnet to selectively elevate the plug to an open position removed from engagement with the drain hole to allow beverage within the brew basket to drain out of the drain hole.

5. The beverage brewer of claim 4 in which the filter assembly includes a reinforcing collar surrounding the mounting hole and the elongate drain plug support member.

6. The beverage brewer of claim 4 in which the filter assembly at least partly supports the plug support member in an upright alignment.

7. The beverage brewer of claim 4 in which the brew basket body has a plug holder that extends downwardly from the bottom and snugly receives a lower end of the elongate drain plug support member adjacent the plug to at least partly support the plug support member in an upright alignment.

8. The beverage brewer of claim 7 in which the brew basket body has a plug holder that extends downwardly from the bottom and snugly receives a lower end of the elongate drain plug support member adjacent the plug to at least partly support the plug support member in an upright alignment.

9. The beverage brewer of claim 4 in which the filter assembly includes a planer disk of metallic filter mesh surrounding the mounting hole.

10. The beverage brewer of claim 4 in which
the brew basket body has a cylindrical upper section and a conical lower section, and
the filter assembly has circular shape that snugly fits within the upper section and is removably supported by the conical lower section at a junction between the upper section and the lower section.

11. The beverage brewer of claim 4 in which the elongate drain plug support member carries a blocking member beneath the mounting hole to prevent the passage of the bottom end of the support member to pass through the mounting hole to enable the elongate plug support member to be used as a handle to remove the filter assembly from without the open top of the brew basket body.

12. In a beverage brewer having a housing with source of dispense water for mixing with beverage ingredient to produce a freshly brewed beverage, the improvement comprising;
an electromagnet mounted to the housing;
a brew basket assembly including
a brew basket body having an open top and a bottom with a drain hole,
a drain plug assembly with
an elongate drain plug support member,
a top end portion of the plug support member with a permanent magnetic material or ferromagnetic material,
a bottom end of the plug support member with a plug engagable with the drain hole to close the drain hole, and
a central hollow core around which the electromagnet is wound with a downwardly facing opening within which the top end portion of the plug support member is slidably received; and
means for removably, toolessly mounting the brew basket to the housing with the top end of the drain plug support member in a location to be magnetically energizable by the electromagnet to selectively elevate the plug to an open position removed from engagement with the drain hole to allow beverage within the brew basket to drain out of the drain hole.

13. The beverage brewer of claim 12 including a guide for guiding the top end portion of the plug support member into mating slidable receipt within the downwardly facing opening.

14. The beverage brewer of claim 13 in which hollow core is cylindrical and the guide is truncated conical.

15. The beverage brewer of claim 1 in which the plug, has a downwardly, inwardly extending conical end with a point for receipt within the drain hole.

16. The beverage brewer of claim 1 in which the bottom end of the plug support member above the plug has a plurality of outwardly extending vanes.

17. The beverage brewer of claim 1 including a drain hole plug holder that extends downwardly from the bottom of the brew basket and is conformed to snugly receive and thereby support the bottom end of the plug support member.

18. The beverage brewer of claim 17 in which
the drain plug holder has an upper cylindrical section, and
the bottom end of the plug support member has a plurality of outwardly extending radial vanes for snug slidable receipt within the drain plug, support member,
gaps between the vanes providing passageways for beverage to flow past the bottom end portion of the plug support member when the drain hole is open.

19. The beverage brewer of claim 18 in which the drain plug holder has a downwardly, inwardly extending section located beneath the cylindrical section of the drain plug holder that terminates in the drain hole.

20. The beverage brewer of claim 1 in which the brew basket body has a plug holder that extends downwardly from the bottom and snugly receives a lower end of the elongate drain plug support member adjacent the plug to at least partly support the plug support member in an upright alignment.

21. The beverage brewer of claim 1 including a source of condensed air pressure and an inlet located above the open top of the brew basket body to pressurize the interior of the brew basket body with the compressed air pressure when the drain hole is open.

22. The beverage brewer of claim 1 which the brewer housing and the brew basket assembly have mating connectors that enable connection of the top of the brew basket to the brewer housing by vertically elevating the brew basket body into connected relationship with the brewer housing without the need for relative lateral movement.

23. The beverage brewer of claim 22 in which the mating connectors are magnetic connectors carried in part by a collar extending laterally outwardly from the brew basket body adjacent the open top.

24. The beverage brewer of claim 1 including a filter assembly mounted within the brew basket body with a mounting hole through which the support member passes for at least partly supporting, the elongate drain plug support member in an upright position within the brew basket body.

25. The beverage brewer of claim 1 including means for at least partly supporting the elongate drain plug support member in an upright position with a plug holder that extends downwardly from a bottom of the brew basket assembly and snugly receives a lower end of the elongate dram plug support member adjacent the plug to at least partly support the plug support member in an upright alignment.

* * * * *